United States Patent
Le Boulc'H et al.

(10) Patent No.: US 8,855,013 B2
(45) Date of Patent: Oct. 7, 2014

(54) DYNAMIC MANAGEMENT OF SIGNAL ROUTING CAPACITY FOR SATELLITES USING A DIGITAL TRANSPARENT PROCESSOR HAVING RAPID RECONFIGURATION

(75) Inventors: Didier Le Boulc'H, Castelginest (FR); Philippe Voisin, Toulouse (FR); Helene Gachon, Toulouse (FR)

(73) Assignee: Thales, Neuilly sur Seine (FR)

( * ) Notice: Subject to any disclaimer, the term of this patent is extended or adjusted under 35 U.S.C. 154(b) by 102 days.

(21) Appl. No.: 13/508,958

(22) PCT Filed: Oct. 1, 2010

(86) PCT No.: PCT/EP2010/064617
§ 371 (c)(1),
(2), (4) Date: May 9, 2012

(87) PCT Pub. No.: WO2011/057861
PCT Pub. Date: May 19, 2011

(65) Prior Publication Data
US 2012/0224606 A1 Sep. 6, 2012

(30) Foreign Application Priority Data
Nov. 10, 2009 (FR) .................................. 09 05402

(51) Int. Cl.
*H04L 12/28* (2006.01)
*H04B 7/185* (2006.01)
*H04L 12/751* (2013.01)
*H04L 12/24* (2006.01)

(52) U.S. Cl.
CPC ............ *H04B 7/18515* (2013.01); *H04L 45/02* (2013.01); *H04L 41/12* (2013.01)
USPC ........................... 370/254; 370/252; 370/253

(58) Field of Classification Search
CPC ................................ H04L 41/12; H04L 45/02
USPC .................. 370/254, 253, 252; 375/302, 272
See application file for complete search history.

(56) References Cited

U.S. PATENT DOCUMENTS

| | | | |
|---|---|---|---|
| 5,825,325 A | 10/1998 | O'Donovan et al. | |
| 6,570,859 B1 | 5/2003 | Cable et al. | |
| 7,167,528 B2 * | 1/2007 | Chen et al. | 375/302 |
| 7,542,716 B2 * | 6/2009 | Bell et al. | 455/3.02 |
| 2003/0227982 A1 * | 12/2003 | Chen et al. | 375/302 |
| 2004/0054766 A1 * | 3/2004 | Vicente | 709/223 |
| 2004/0185775 A1 * | 9/2004 | Bell et al. | 455/12.1 |
| 2010/0034160 A1 * | 2/2010 | Prakash et al. | 370/329 |

FOREIGN PATENT DOCUMENTS

WO 2007/000794 A1 1/2007

\* cited by examiner

*Primary Examiner* — Chuong T Ho
(74) *Attorney, Agent, or Firm* — Baker & Hostetler LLP

(57) ABSTRACT

The present invention relates to a device for managing signal routing on board a satellite, and use of "agile" digital transparent processors. The device decorrelates the spreading band of the uplink to said satellite from the instantaneous useful band of each signal, used for routing on board the satellite and on the downlink. For a given protection dictating the spreading width of the uplink signals, the device makes it possible to optimize connectivity, i.e. the number of routes through said satellite, as well as the total capacity of the satellite by means of individualized control of the gain of each route. The routing band is limited to the instantaneous useful communication band and is not extended to the spreading band of the uplink. The band used in the downlink by each signal can also be limited to the instantaneous useful band or possibly widened by a new frequency spread.

5 Claims, 3 Drawing Sheets

DYNAMIC MANAGEMENT OF SIGNAL ROUTING CAPACITY FOR SATELLITES USING A DIGITAL TRANSPARENT PROCESSOR HAVING RAPID RECONFIGURATION

CROSS-REFERENCE TO RELATED APPLICATIONS

This application is a National Stage of International patent application PCT/EP2010/064617, filed on Oct. 1, 2010, which claims priority to foreign French patent application No. FR 09 05402, filed on Nov. 10, 2009, the disclosures of each of which are incorporated by reference in their entireties.

FIELD OF THE DISCLOSED SUBJECT MATTER

The present invention relates to the field of communication satellites including a digital processor.

The invention relates more precisely to a device for managing signal routing in a satellite of this type, i.e. including a digital processor and in particular a digital transparent processor.

BACKGROUND

The role of communication satellites is essentially to retransmit after amplification signals transmitted by transmitter ground stations on uplinks to receiving ground stations via downlinks. Thus a satellite of this kind regularly receives a set of incoming signals, corresponding to "uplink" signals, transmitted by the transmitter ground stations and distributed over a set of input channels of the satellite and, in accordance with a predetermined configuration, routes those signals to output channels: a set of outgoing signals is then transmitted by the satellite to the receiving ground stations. In this context one refers to routing signals on board the satellite via the digital processor with which it is equipped. The configuration for routing signals in present-day satellites is most often static. Thus once set up by the satellite it is unchangeable or at the least slowly reconfigurable.

Satellites currently in use sometimes include analog processors. Such processors generate routes linking input channels to output channels that conventionally have a bandwidth in the range 5 to 50 MHz. However, satellites being developed now may include digital processors, notably enabling each satellite to handle a greater number of channels, smaller and more programmable bandwidths, and making it possible to increase connectivity between inputs and outputs.

In the context of the invention, of particular relevance are communication satellites including digital transparent processors. As is known in the art, a digital transparent processor is a digital processor that enables each incoming channel to be divided into sub-channels of variable width, typically in the range from a few hundred kHz to a few MHz. Moreover, the qualifier "transparent" is the opposite of "regenerative": regenerative processors carry out processing aiming to demodulate the transmitted signals; this is not the object of a digital transparent processor, which does not modify the form of the received signals.

Accordingly, some recent satellites have digital transparent processors enabling routing and control of any input sub-channel to any output sub-channel. This also enables optimization of the gain required for each signal on each sub-channel.

In this context, the main failing of present-day technologies is that the digital transparent processors used are static or quasi-static. In other words, reconfiguring the routing of signals on board present-day satellites, even the most recent ones, is very slow: it is impossible to change it several times per second, whereas the uplink signal to the satellite may, in some cases, change frequency at a rate much higher than once per second. It is therefore impossible for the digital processor to track the instantaneous evolution of the received signal.

SUMMARY

An object of the invention is to remedy this major drawback. Thus to provide the possibility of reconfiguring the routing of signals on board communication satellites in real time, the present invention proposes to use instead of the present day digital transparent processors that are not reconfigurable or slowly reconfigurable so-called agile digital transparent processors.

To this end, the invention provides a signal routing device for satellites, including a digital transparent processor and enabling reception at a set of inputs of a set of incoming signals transmitted by transmitter stations and transmission, via a set of outputs, of a corresponding set of outgoing signals to receiving stations, in accordance with a configuration for routing the signals, used by said digital transparent processor, said inputs being associated with a set of input channels and sub-channels and said outputs being associated with a set of output channels and sub-channels, said signal routing configuration making it possible to determine a set of routes linking, via connecting electronic means, at least one input channel or sub-channel associated with at least one input via which an incoming signal is received to at least one output channel or sub-channel associated with at least one output via which an outgoing signal is transmitted, characterized in that the digital transparent processor has a capacity for rapid reconfiguration of signal routing at a high reconfiguration frequency exceeding ten hertz so that the route between an input channel or sub-channel and an output channel or sub-channel may be modified at a frequency equal to said reconfiguration frequency, and in that the device further includes means making use of said capacity for rapid reconfiguration of signal routing.

In one embodiment of the invention the routing reconfiguration frequency is in the range from one kilohertz to twenty kilohertz.

The means for making use of the capacity for rapid reconfiguration of signal routing are advantageously essentially constituted of an onboard equipment in the satellite adapted to execute a computer program cooperating with said digital transparent processor.

The device according to the invention advantageously further includes means for synchronizing rapid reconfiguration of signal routing to a frequency changing law of the incoming signals transmitted by one or more transmitter stations configured in frequency hopping mode.

In a preferred embodiment of the invention said means for synchronizing rapid reconfiguration of signal routing to a frequency changing law for incoming signals transmitted by one or more transmitter stations configured in frequency hopping mode comprise a dedicated high-speed communication link enabling said transmitter stations configured in frequency hopping mode to communicate to said means instructions for rapid reconfiguration of signal routing adapted to said frequency changing law.

The dedicated high-speed communication link described above advantageously enables a communication data rate of a few megabits per second.

In one embodiment of the invention a plurality of incoming signals that must take the same route may be grouped in such a manner that only one outgoing signal corresponding to said grouped incoming signals is transmitted.

In the device according to the invention, for each route, the connection electronic means may comprise a chain of electronic components aiming at providing the following functions:

- filtering the incoming signals to extract those signals and produce first intermediate signals;
- controlling the power of the first intermediate signals in such a manner as to produce second intermediate signals;
- changing the frequency of the second intermediate signals in such a manner as to produce third intermediate signals;
- controlling the gain of the third intermediate signals in such a manner as to produce outgoing signals with the required power.

BRIEF DESCRIPTION OF THE DRAWINGS

Other features and advantages of the invention will become apparent in the light of the following description with reference to the appended drawings, in which.

DETAILED DESCRIPTION

Figure 1:
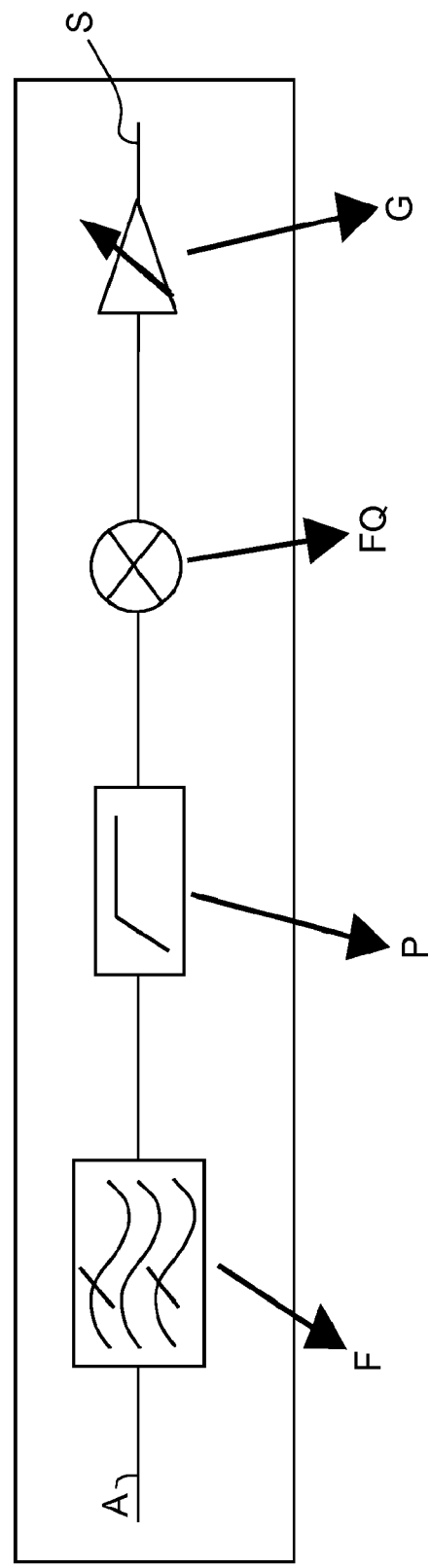
FIG. 1 is a simplified diagram of an example of signal routing by analogue processing in a prior art satellite.

FIG. 1 is a diagram used to explain the operation of present-day conventional payloads in relation to transparent technology communication satellites, conforming to the definition of the qualifier "transparent" given hereinabove. In FIG. 1 it is seen that present-day conventional payloads are equipped on each of their channels with different microwave equipments disposed between the access A of the satellite, corresponding to an input of the satellite associated with an input channel, and the output S, associated with an output channel, from which a signal is transmitted to the ground. Said microwave equipments are generally:

- a filter device F for filtering the signal entering the satellite;
- a power control device P;
- a device FQ for modifying the frequency of the signal;
- a device G for managing the gain applied to said signal to transmit it to the ground;
- possibly, a power measurement and automatic gain control device, which therefore controls the output power level; and
- possibly, a device for linearization or pre-distortion of the signal.

Moreover, the incoming signals may have necessitated demultiplexing whereas reciprocally the outgoing signals may have been multiplexed.

Accordingly, in prior art payloads, all operations effected on board the satellite, namely, as explained above, possibly changing frequency, limiting the power of the received signals, or managing the gain applied to those signals, is effected at the level of each of the channels. This is disadvantageous because the required bandwidth for each channel may typically be of the order of 20 MHz to 40 MHz or more. The other failing lies in the fact that the operations effected on the incoming signals may not be individualized for each sub-channel. Consequently, if a channel comprises diverse sub-channels, i.e. supports different independent incoming signals that may in principle necessitate individualized processing, the processing effected on board is unique for each channel; it is therefore identical for all the sub-channels.

The drawbacks that follow on from these technologies are essentially reflected in a lack of flexibility in use and a deficit in terms of connectivity between the various input and output spots, notably because of the impossibility of managing the routing of sub-channels in an individualized manner.

These technologies are therefore incompatible with present-day needs, which call for more and more numerous inputs and outputs, and thus more and more connectivity, as well as more and more security, and thus high channel widths.

Figure 2:
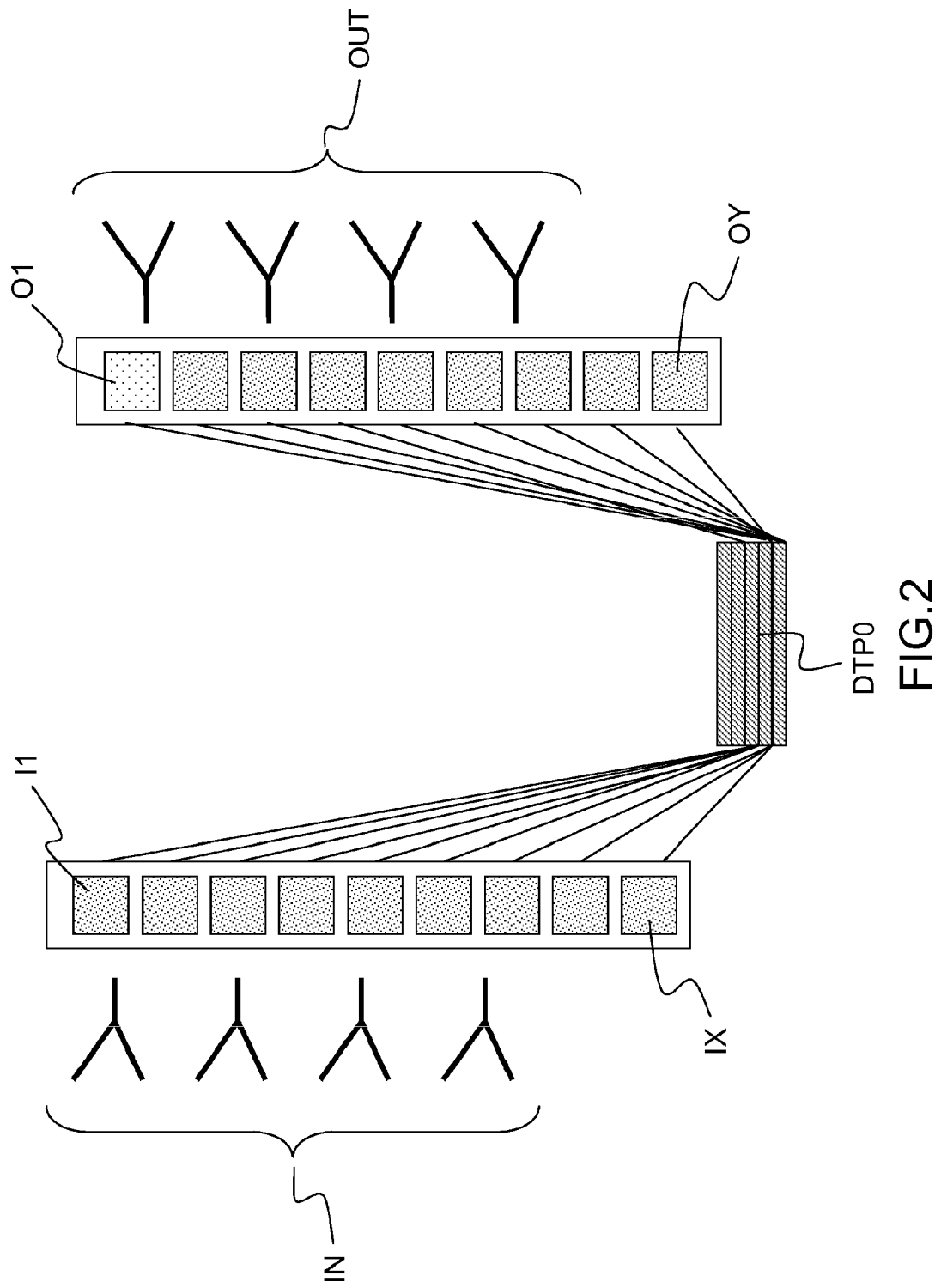
FIG. 2 is a diagram of an example of a known use of a "static" digital transparent processor for routing signals on board a communication satellite.

As a partial remedy to these drawbacks, the prior art has already adopted the use of digital transparent processors, the operation of which is illustrated by FIG. 2.

The FIG. 2 diagram is a very simplified representation of a recent communication satellite payload having a set of input spots IN, each input being associated with one or more input channels or sub-channels I1-IX, and a set of output spots OUT to which are connected one or more output channels or sub-channels O1-OY. The payload represented in FIG. 2 further includes a digital transparent processor DTP0. The use of digital transparent processors in the recent prior art enables the problem of the multiplicity of connectivities to be partly solved. Thus the digital transparent processor DTP0 is capable of managing individually the channels and sub-channels I1-IX, applying to them individualized digital processing and an individualized gain, and connecting them to any output channel or sub-channel O1-OY. Thus the digital transparent processor DTP0 enables routing and control of channels or sub-channels from any input access or spot IN to any output access or spot OUT, and positioning it in any part of the output spectrum, i.e. at any compatible frequency of the output spots OUT. This type of technology also enables optimization of the capacity of modern communication satellites because of the possibility of adjusting the gain associated with each channel or sub-channel.

The problem with present-day digital transparent processors DTP0 lies in the fact that they enable only "static" routing of channels. The configuration for routing signals on board the satellites is fixed; it can be modified in use only at the cost of a slow reconfiguration, typically taking an hour, which is totally incompatible with the rapidity at which the incoming signals fluctuate. Accordingly, if signals transmitted by transmitter stations toward the satellite go to the "frequency hopping" mode, the total bandwidth occupied by the signals, called the "frequency hopping band", becomes much larger than the band occupied by a signal at a given time, which for its part depends essentially on the quantity of information to be transmitted. With a digital transparent processor DTP0, the routing configuration on board the satellite is fixed or slowly reconfigurable; the channel configuration of the satellite must therefore be adapted to the hopping band, which imposes relatively wide channels or sub-channels and therefore relatively few channels or sub-channels for a limited satellite bandwidth. In contrast, if the channel configuration is rendered rapidly reconfigurable by an agile digital transparent processor, as recommended by the present invention and in accordance with the description given hereinafter of FIG. 3, the sub-channel configuration may track rapid fluctuations of the uplink signal and adapt to the really useful band of the signal at a given time, called the "instantaneous useful band". This instantaneous band being smaller by one to three orders of magnitude than the hopping band, the number of sub-channels may be increased by one to three orders of magnitude, enabling an increase in connectivity also by one to three orders of magnitude.

The frequency plan that the digital transparent processor DTP0 must use is then defined by remote control from said transmitter stations. Accordingly, present-day digital transparent processors DTP0 offer no capacity for processing and transmission on board the satellite of signals in "frequency hopping" mode; they can route them only by enlarging the sub-channels to a bandwidth at least equal to the hopping band, losing the advantage of increased connectivity achieved by the sub-channel configuration of the DTP0.

Moreover, if the sub-channels X1-IX have gone to the "frequency hopping" mode and are liable to be routed to different outputs of the digital transparent processor DTP0 and thus to different channels or sub-channels O1-OY, this constraint imposes switching of all the channels and sub-channels concerned to the "frequency hopping" mode, including on the downlink, i.e. at the output of the communication satellite, which may rapidly lead to having all of the traffic processed in the digital transparent processor DTP0 that switches to the "frequency hopping" mode to prevent collisions at the output spots OUT.

Because of this, even if the use of "frequency hopping" communication is useful above all for the uplink to the satellite, the downlink will also be in "frequency hopping" mode.

Consequently, as soon as a few sub-channels have gone to the "frequency hopping" mode, it is no longer possible to manage the sub-channels individually with the digital transparent processors DTP0 of the present-day generation. This is reflected in an overconsumption of bandwidth on the downlink from the satellite.

It is to alleviate the drawbacks referred to above of present-day digital transparent processors that, in the context of the present invention, so-called agile digital transparent processors have been developed. These agile digital transparent processors have the advantage of being reconfigurable very rapidly and in particular of being able to adapt to each frequency hop.

Figure 3:
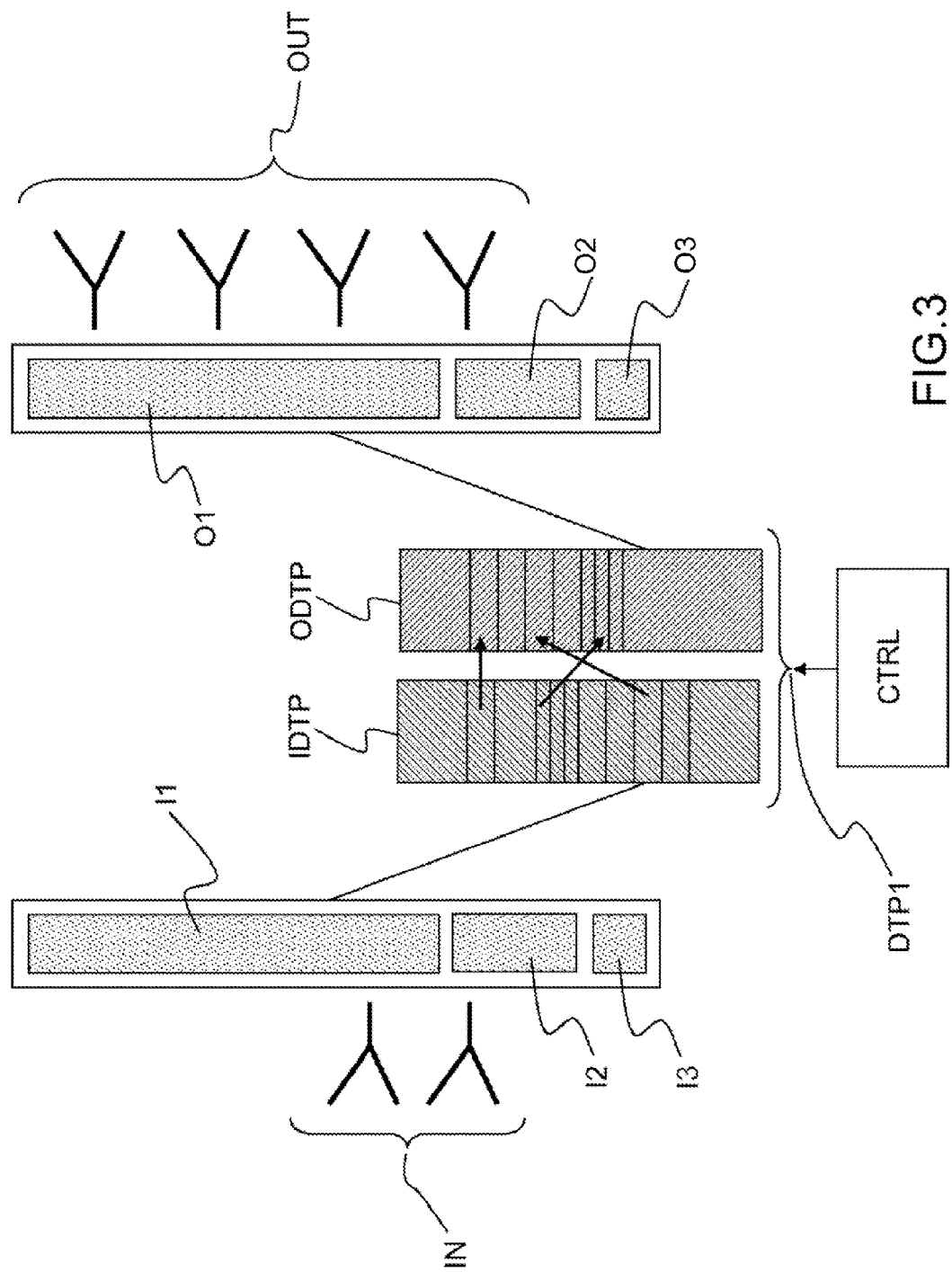
FIG. 3 is a diagram used to explain in simple terms the principle of the invention, based on the use of an "agile" digital transparent processor.

FIG. 3 shows diagrammatically the operation of payloads equipped with agile digital transparent processors.

The payload shown partly and diagrammatically in FIG. 3 has a set of input spots I1, I2, I3 and a set of output spots O1, O2, O3. The input channels and sub-channels I1, I2, I3 and the output channels and sub-channels O1, O2, O3 may have a bandwidth of several hundred megahertz. The digital transparent processor DTP1 has the particular feature of being "agile", i.e. of being reconfigurable very rapidly.

Thus the agile digital transparent processor DTP1 is capable of managing in parallel channels or sub-channels in "frequency hopping" mode, for example I1, and others operating at fixed frequencies, for example I2 and I3. In fact, the digital transparent processor DTP1 of the invention may be configured by means of a device CTRL, preferably an onboard device, enabling reconfiguration in real time of the routing of signals on board the satellite. In a preferred embodiment of the invention, the reconfiguration of the routing of signals on board the satellite by the agile digital transparent processor DTP1 is synchronized to the timing of the changes of frequency when uplink signals to the satellite are in "frequency hopping" mode. As FIG. 3 shows, the agile digital transparent processor DTP1 has a set of input sub-channels IDTP and a set of output sub-channels ODTP. The onboard signal routing configuration consists, as the arrows in FIG. 3 show, in managing connectivity on board the satellite: the input channels or sub-channels I1, I2, I3 are processed and connected to output channels or sub-channels O1, O2, O3. The particular feature of the invention lies in the facility offered by the agile digital transparent processor DTP1 of very rapidly modifying said signal routing configuration on board the satellite and the positioning in frequency terms of the downlink signals. This variable frequency positioning of the output signals of the agile digital transparent processor DTP1 may constitute a complete despreading, for fixed-frequency signals, or a respreading different from the uplink spreading through rapid control of the frequency position of each signal.

To provide this function, the invention relies on the use of the control device CTRL, which is preferably synchronized to the frequency changes of the uplink signals, enabling real time modification of the signal routing configuration on board the satellite by the digital transparent processor DTP1. To this end, a dedicated high-speed communication link enables the control device CTRL to track the information relating to the frequency changes of the uplink signals, said information being transmitted by the ground stations transmitting the uplink signals in "frequency hopping" mode.

It should be noted that, in this context, the dedicated high-speed link must be consistent with the timing of the frequency changes of the uplink signals, said uplink signals having to be synchronized with the same clock reference, and said clock reference also having to be distributed on board the satellite. This enables the possibility of synchronizing the timing of signal routing reconfiguration on board the satellite via the agile digital transparent processor DTP1 to the timing of the frequency changes of the uplink signals in "frequency hopping" mode to be guaranteed.

To summarize, the present innovation consists in the development and the use of agile digital transparent processors in the context of communication satellites.

The invention has the major advantage of enabling decorrelation of the spreading band of the uplink, also called the hopping band, and the band used for routing the signal in the satellite. The band used on the downlink may also be limited to the instantaneous useful band or widened by spreading generated by the variable frequency positioning at the output of the agile DTP. Because of this, the invention enables optimization, on the one hand, of the protection capacities of communication satellites, by the possibility of spreading of the uplink in a wide band and that, on the other hand, of the connectivity capacities and total capacity of said communication satellites, as the number of sub-channels can be increased and the bandwidth used on the downlink can be limited to the instantaneous useful communication band and not extended to the spreading band of the uplink.

The invention claimed is:

1. A signal routing device for a satellite, the device comprising:
   a digital transparent processor;
   wherein the device enables reception at a set of inputs of a set of incoming signals transmitted by transmitter stations and transmission via a set of outputs, of a corresponding set of outgoing signals to receiving stations, in accordance with a configuration for routing the signals, used by said digital transparent processor;
   wherein said inputs are associated with a set of input channels and sub-channels and said outputs are associated with a set of output channels and sub-channels, said signal routing configuration making it possible to determine a set of routes linking, via connecting electronic means, at least one input channel or sub-channel (I1) associated with at least one input via which an incoming signal is received to at least one output channel or sub-channel associated with at least one output via which an outgoing signal is transmitted;

wherein the digital transparent processor has a capacity for rapid reconfiguration of signal routing at a reconfiguration frequency exceeding ten hertz so that a route between an input channel or sub-channel and an output channel or sub-channel may be modified at a frequency equal to said reconfiguration frequency; and wherein the device is configured to make use of said capacity for rapid reconfiguration of signal routing, the device further comprising means for synchronizing rapid reconfiguration of signal routing to a frequency changing law of the incoming signals transmitted by one or more transmitter stations configured in frequency hopping mode, said means for synchronizing rapid reconfiguration of signal routing to a frequency changing law for incoming signals transmitted by one or more transmitter stations configured in frequency hopping mode comprises a dedicated high-speed communication link enabling said transmitter stations configured in frequency hopping mode to communicate to said means instructions for rapid reconfiguration of signal routing adapted to said frequency changing law, wherein said dedicated high-speed communication link enables a communication data rate in the range from a few kilobits to a few tens of megabits per second.

2. The device as claimed in claim 1, wherein the routing reconfiguration frequency is in the range from one kilohertz to twenty kilohertz.

3. The device as claimed in claim 1, further comprising an onboard equipment in the satellite adapted to execute a computer program cooperating with said digital transparent processor for making use of the capacity for rapid reconfiguration of signal routing.

4. The device as claimed in claim 1, wherein a plurality of incoming signals that must take the same route may be grouped in such a manner that only one outgoing signal corresponding to said grouped incoming signals is transmitted.

5. The device as claimed in claim 1, wherein, for each route, the connection electronic means comprises a chain of electronic components configured to provide the following functions:
- filtering the incoming signals to extract those signals and produce first intermediate signals;
- controlling the power of the first intermediate signals to produce second intermediate signals;
- changing the frequency of the second intermediate signals to produce third intermediate signals; and
- controlling the gain of the third intermediate signals to produce outgoing signals with a required power.

* * * * *